United States Patent Office 2,816,133
Patented Dec. 10, 1957

2,816,133

DIMETHYLAMINOETHYL ESTERS OF POLYALKOXY BENZOIC AND CINNAMIC ACIDS

Kenneth Nielsen Campbell, Evansville, Ind., assignor to Mead Johnson & Company, Evansville, Ind., a corporation of Indiana No Drawing. Application August 8, 1955,
Serial No. 527,135

8 Claims. (Cl. 260—473)

This invention relates to β-dimethylaminoethyl esters of polyalkoxy benzoic and cinnamic acids. More specifically, this invention relates to esters having the structural formula:

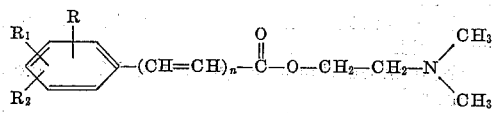

wherein $n$ is zero or 1; and R, $R_1$ and $R_2$ each are lower alkoxy groups attached to a carbon atom in the ring nucleus. Where $n$ is zero the compound indicated by the above formula is an ester of a trialkoxy benzoic acid and where $n$ is 1 the compound is an ester of a trialkoxy cinnamic acid. As the above structural formula indicates, the R, $R_1$ and $R_2$ groups may be attached to the benzene nucleus at any one of the ring carbon atoms. Generally speaking, the alkoxy groups are lower alkoxy groups having from one to four carbon atoms represented by methoxy, ethoxy, propoxy, allyloxy and butoxy groups. It will also be appreciated that the several alkoxy groups may be the same or different in any desired arrangement in the molecule. Inasmuch as the esters herein claimed are also tertiary amines, it will be readily apparent that this invention contemplates and the foregoing structural formula comprehends nontoxic acid addition compounds, such as the salts of the base with organic or inorganic acids (e. g. the hydrochlorides), or the quaternary ammonium salts, all as well known to those skilled in the art.

Representative compounds of this invention falling within the generic structural formula indicated above are the β-dimethylaminoethyl esters of 2,3,4-trimethoxybenzoic acid, 2,3,5-trimethoxybenzoic acid, 2,3,6-trimethoxybenzoic acid, 3,4,5-trimethoxybenzoic acid, 2,3,4-trimethoxycinnamic acid and 3,4,5-trimethoxycinnamic acid. As indicated above, it will be readily apparent that other alkoxy groups, preferably those having from one to four carbon atoms, may be substituted for one or more of the several methoxy groups in the compounds specified above.

Compounds of this invention have desirable pharmacological properties and when administered to animals affect the cardiovascular dynamics. They are nontoxic and particularly useful in the treatment of cardiovascular abnormalities, for example, hypertension. The compounds may be used as such or in the form of the nontoxic acid addition compounds, such as the hydrochlorides. They may be administered rectally in the form of suppositories or orally in the form of tablets, solutions or elixirs. In the case of the ester of 3,4,5-trimethoxybenzoic acid a suitable dosage for an adult is between about one and 50 milligrams per day. Other compounds may require a larger or smaller dosage depending upon the activity of the compound and the effect desired on the patient.

The compounds of this invention are prepared by conventional esterification procedures from the selected polyalkoxy benzoic or cinnamic acid and β-dimethylaminoethanol. In one such procedure the acid chloride of the polyalkoxy acid is first prepared which is thereafter reacted with the specified amino alcohol to form the ester. The ester compound may be separated and purified by conventional procedures and, if desired, may be converted to an acid addition compound or a quaternary ammonium salt.

For a more complete understanding of this invention, reference will now be made to several examples showing the preparation of certain of the specific compounds contemplated within the scope of this invention.

Example 1

A mixture of 7 grams (0.033 mole) of 3,4,5-trimethoxybenzoic acid (commercially available) and 11.9 grams (0.10 mole) of thionyl chloride was refluxed for two hours, and the excess thionyl chloride was removed by evaporation in vacuo. The solid residue of 3,4,5-trimethoxybenzoyl chloride was taken up in 15 milliliters of anhydrous benzene, and benzene was then removed in vacuo; this removed any occluded thionyl chloride, hydrogen chloride or sulfur dioxide from the acid chloride. The 3,4,5-trimethoxybenzoyl chloride so obtained was dissolved in 50 milliliters of anhydrous toluene. This solution was added dropwise to a solution of 8.9 grams (0.10 mole) of β-dimethylaminoethanol in 25 milliliters of dry toluene contained in a three-neck flask equipped with a mechanical stirrer, a dropping funnel and a drying tube. The reaction mixture was cooled in an ice bath during the addition of the acid chloride, and was then warmed gradually to 100° C. and kept there for one hour. The precipitate of β-dimethylaminoethanol hydrochloride was removed by filtration; the filtrate was washed three times with 15 milliliter portions of water to remove excess amino alcohol, and then was dried over anhydrous magnesium sulfate. The solvent was removed and the product was distilled in vacuo. There was obtained 7.65 grams (82%) of β-dimethylaminoethyl 3,4,5-trimethoxybenzoate, B. P. 155° C. at 0.5 mm.

To produce the hydrochloride the amino ester was dissolved in 150 milliliters of anhydrous ether and the solution was saturated with anhydrous hydrogen chloride. The precipitate was collected, washed with dry ether and recrystalled from anhydrous n-propanol. There was obtained 7.1 grams (68%) of β-dimethylaminoethyl 3,4,5-trimethoxybenzoate hydrochloride as a white, crystalline solid, M. P. 126–127° C.

Example 2

The same procedure set forth in Example 1 was employed except that 2,3,4-trimethoxybenzoic acid (R. Meals, J. Org. Chem. 9:211, 1944) was esterified. The resulting ester had a boiling point between 142° and 146° C. at 0.5 mm.; $N_D^{20}$ 1.5195. The hydrochloride had a melting point between 132° and 133° C.

Example 3

The same procedure as above indicated was used to esterify 2,4,6-trimethoxybenzoic acid (Holmes et al., J. Chem. Soc. 1950: 2810). The resulting ester melted at 61–62° C. and the hydrochloride had a melting point between 190° and 191° C.

Example 4

The same procedure as previously indicated was employed to esterify 2,3,4-trimethoxycinnamic acid (Slotta et al., Ber., 63B:3402, 1930) and the hydrochloride of the resulting ester had a melting point between 121° and 122° C.

Example 5

The same procedure was employed to esterify 3,4,5-trimethoxycinnamic acid (Slotta et al., Ber., 63B:3402, 1930) and the hydrochloride of the resulting ester had a melting point of between 182° and 183° C. at which temperature it tended to decompose.

It will be appreciated from the foregoing examples that esters of other derivatives of the polyalkoxy cinnamic and benzoic acids can be similarly prepared. The particular tribenzoic and cinnamic acids are in themselves known to the art and may be prepared in accordance with the procedures outlined in the several references to the literature given in the foregoing examples or may be obtained from any one of a number of sources depending upon the particular acid and any of such acids may be utilized to form the ester of β-dimethylaminoethanol. An important feature of the compounds of this invention is that they all include the β-dimethylaminoethyl group and, on the basis of tests that have been made to date, this paricular group is important in the polyalkoxy benzoic or cinnamic acid esters of this invention to provide compounds which give the most pronounced and prolonged lowering of blood pressure when administered to animals.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. A compound having the formula:

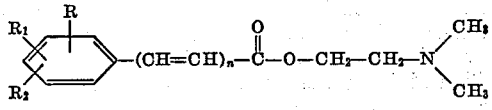

wherein $n$ is a whole number selected from the class consisting of zero and 1; and R, $R_1$ and $R_2$ are methoxy groups.

2. An ester of a benzoic acid derivative having the formula:

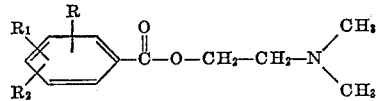

wherein R, $R_1$ and $R_2$ are methoxy groups.

3. An ester of a cinnamic acid derivative having the formula:

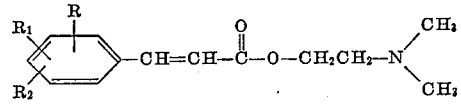

wherein R, $R_1$ and $R_2$ are methoxy groups.

4. The β-dimethylaminoethyl ester of 2,3,4-trimethoxybenzoic acid.
5. The β-dimethylaminoethyl ester of 2,4,6-trimethoxybenzoic acid.
6. The β-dimethylaminoethyl ester of 3,4,5-trimethoxybenzoic acid.
7. The β-dimethylaminoethyl ester of 2,3,4,-trimethoxycinnamic acid.
8. The β-dimethylaminoethyl ester of 3,4,5-trimethoxycinnamic acid.

References Cited in the file of this patent

Lofgren et al.: Chem. Abst., 43, 1022–3 (1949), Citing Svensk Kem. Tid., 58, 206 (1946).
Rabjohn et al.: J. Org. Chem. 21, 218–9 (1956).